(12) United States Patent
Greenwald et al.

(10) Patent No.: US 7,918,156 B2
(45) Date of Patent: *Apr. 5, 2011

(54) COLD BEVERAGE DISPENSER

(75) Inventors: Shlomo Greenwald, Ithaca, NY (US); Zipora Greenwald, Ithaca, NY (US)

(73) Assignee: Greenwald Technologies, LLC, Ithaca, NY (US)

( * ) Notice: Subject to any disclaimer, the term of this patent is extended or adjusted under 35 U.S.C. 154(b) by 1461 days.

This patent is subject to a terminal disclaimer.

(21) Appl. No.: 11/326,785

(22) Filed: Jan. 6, 2006

(65) Prior Publication Data

US 2006/0112831 A1    Jun. 1, 2006

Related U.S. Application Data

(63) Continuation-in-part of application No. 11/155,058, filed on Jun. 17, 2005, now Pat. No. 7,654,191.

(60) Provisional application No. 60/642,311, filed on Jan. 7, 2005.

(51) Int. Cl.
*A47J 31/00* (2006.01)
*B67D 7/74* (2010.01)

(52) U.S. Cl. .............. 99/275; 99/280; 99/290; 99/323.3; 222/129.1; 222/129.3; 222/146.1; 222/144.5; 222/145.5

(58) Field of Classification Search .................... 99/275, 99/290, 280, 283, 284, 323.3; 222/129.2, 222/129.4, 132, 144.5, 145.5, 146.6, 146.1, 222/129.1, 129.3
See application file for complete search history.

(56) References Cited

U.S. PATENT DOCUMENTS

| | | | |
|---|---|---|---|
| 2,657,628 A | | 11/1953 | Von Stoeser |
| 2,682,984 A | | 7/1954 | Melikian et al. |
| 2,712,887 A | * | 7/1955 | King ............................ 222/132 |
| 2,776,074 A | | 1/1957 | St. Laurence |
| 2,838,077 A | | 6/1958 | Cooper |
| 3,211,331 A | * | 10/1965 | Hoffman et al. ................. 222/1 |
| 3,532,505 A | | 10/1970 | Cornelius |
| 3,634,107 A | | 1/1972 | Cornelius |
| 3,641,918 A | | 2/1972 | Schellgell |
| 3,795,788 A | | 3/1974 | Perucca |
| 4,137,833 A | | 2/1979 | Yelloz |
| 4,140,150 A | | 2/1979 | Rundall |
| 4,470,999 A | | 9/1984 | Carpiac |
| 4,550,651 A | | 11/1985 | Haynes |
| 4,649,809 A | * | 3/1987 | Kanezashi ..................... 99/290 |
| 4,757,752 A | | 7/1988 | Robins et al. |
| 4,791,860 A | | 12/1988 | Verheijen |
| 4,792,059 A | | 12/1988 | Kerner et al. |
| 4,920,871 A | | 5/1990 | Anson |
| 5,014,611 A | | 5/1991 | Illy et al. |
| 5,042,689 A | | 8/1991 | Mrugala et al. |
| 5,497,918 A | | 3/1996 | Brilanchik |
| 5,551,331 A | | 9/1996 | Pfeifer |
| 5,584,229 A | | 12/1996 | Anson |
| 5,724,883 A | | 3/1998 | Usherovich |
| 5,858,437 A | | 1/1999 | Anson |
| 5,975,365 A | * | 11/1999 | Hsieh ......................... 222/129.4 |
| 6,889,600 B2 | | 5/2005 | Rava |

* cited by examiner

*Primary Examiner* — Reginald L Alexander
(74) *Attorney, Agent, or Firm* — Brown & Michaels, PC

(57) ABSTRACT

The invention presents a cold beverage dispenser which uses a heat exchanger to cool incoming water with a very cold closed loop of chilled coolant. Under control of a control system, the cooled water from the heat exchanger is mixed with uncooled input water to regulate its temperature, then (if desired) carbonated. The regulated temperature water, optionally carbonated, is mixed with a liquid concentrate and dispensed at one or more dispensing stations. Preferably, the temperature, carbonation and strength of the dispensed beverage is controllable by the consumer.

17 Claims, 1 Drawing Sheet

COLD BEVERAGE DISPENSER

REFERENCE TO RELATED APPLICATIONS

This application claims an invention which was disclosed in Provisional Application No. 60/642,311, filed on Jan. 7, 2005, entitled "Beverage Dispenser with Disposable Pump". The benefit under 35 USC §119(e) of the United States provisional application is hereby claimed, and the aforementioned application is hereby incorporated herein by reference.

This application is a continuation-in-part of co-pending application Ser. No. 11/155,058 entitled "Beverage Dispenser", filed on Jun. 17, 2005, which application is incorporated herein by reference. The '058 application claimed the benefit of the provisional application listed above, and also Ser. Nos. 60/586,105, filed Jul. 7, 2004, entitled "Hot Beverage Dispenser" and 60/682,107, filed May 18, 2005, entitled "Plastic Pump for Beverage and Soap Dispensing"

BACKGROUND OF THE INVENTION

1. Field of the Invention

The invention pertains to the field of beverage dispensers. More particularly, the invention pertains to dispensers for cold beverages.

2. Description of Related Art

In the current commercial cold beverage dispensers, the incoming water is flowing through a high power chiller which has to cool down the water in a one pass flow-through manner. When the dispenser is not used a significant amount of water is left in the idle chiller and in the tubing from the chiller to the output valves on each of the dispensing spigots. At periods of the day when there are relatively small number of users the trapped water will warm up and when the next person is dispensing his beverage the first amount of water dispensed will be the trapped warmer water. In commercial cold beverage dispensers the amount of the trapped water is significant. On the other hand during the periods of the day when there are relatively large number of users the chiller is not able to cool the water to the desired temperature. Therefore the dispensed beverage temperature can vary significantly from one customer to the other.

SUMMARY OF THE INVENTION

The invention presents a cold beverage dispenser which uses a heat exchanger to cool incoming water with a very cold closed loop of chilled coolant. Under control of a control system, the cooled water from the heat exchanger is mixed with uncooled input water to regulate its temperature, then (if desired) carbonated. The regulated temperature water, optionally carbonated, is mixed with a liquid concentrate and dispensed at one or more dispensing stations. Preferably, the temperature, carbonation and strength of the dispensed beverage is controllable by the consumer.

The design of the cold beverage dispenser of the invention allows each customer to select the dispensed beverage temperature according to his preference with accuracy of 1° F. In addition our innovative dispenser will allow each customer to design his own beverage according to his preference to enhance his satisfaction. The customer will be able to determine the sweetness (strength) of the dispensed beverage and the amount of carbonation according to his desire.

DETAILED DESCRIPTION OF THE INVENTION

Figure 1:
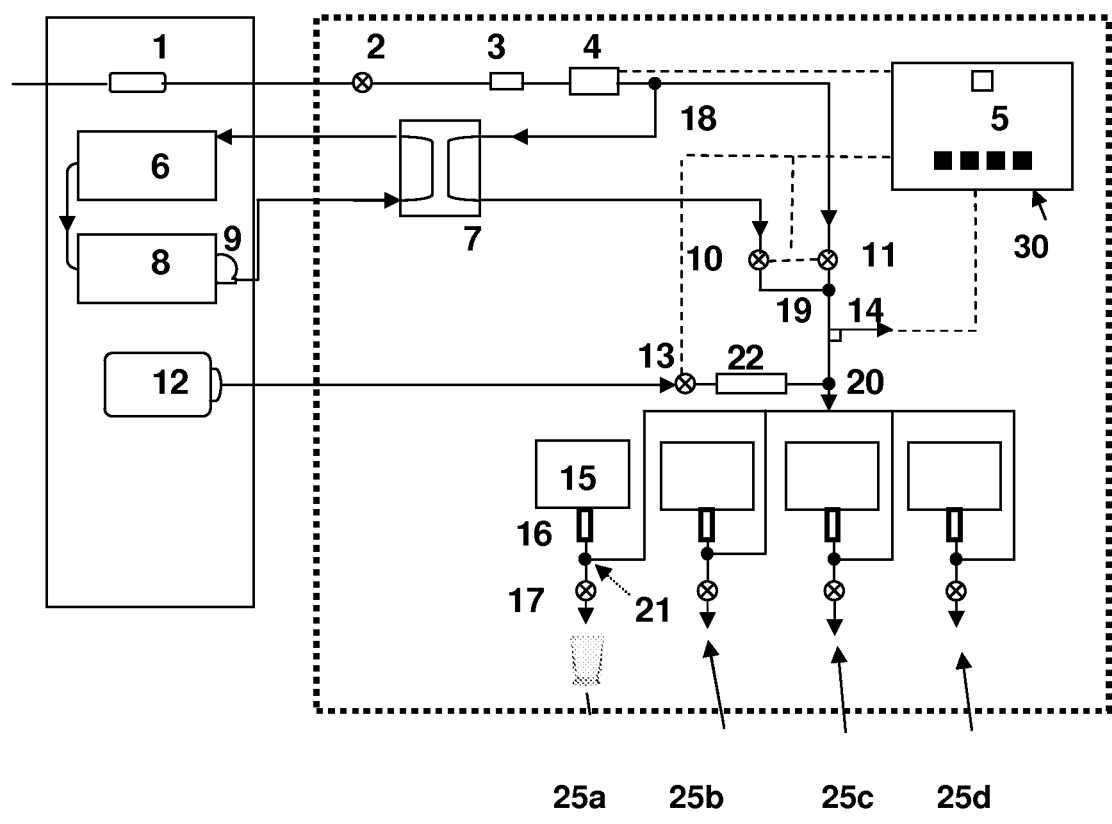
FIG. 1 shows a schematic drawing of the cold beverage dispenser of the invention.

One of the innovations of our cold beverage dispenser is that it will allow each customer to design his beverage according to his preference. Using a sophisticated, menu driven touch screen technology the customer can modify three parameters of his beverage via the soft keys on the touch screen of the controller. The customer can select the temperature, strength, and carbonation of his beverage according to his preference which will increase his enjoinment from the cold beverage.

A schematic drawing of the multi-spigot cold beverage dispenser can be seen in FIG. 1. The dispenser can be divided into the following subsystems:
  A. Closed loop cooling system
  B. Input water system
  C. Liquid Concentrate dispensing system
  D. Micro-computer based digital controller and user interface In our cooling system, as opposed to the current cold beverage dispensers, we can use much smaller chiller since:
  A. The very cold coolant is circulating continuously through the chiller 6 and the Heat Exchanger 7 at a rate of a few gallons per minute which improves the cooling efficiency of the chiller 6 and the cooling efficiency of the Heat Exchanger 7; and
  B. We are using a very cold coolant reservoir tank 8 of a few gallons.

The closed loop water cooling system includes a water chiller 6, a coolant liquid insulating tank 8, the coolant circulating pump 9, and a high efficiency heat exchanger 7. The chiller 6, the coolant holding tank 8, and the coolant circulating pump 9 can be located outside the main dispenser and only the heat exchanger 7 in located inside the dispenser. This will minimize the dispenser size, simplify the dispenser design, and lower the cost of manufacturing. For a mid size commercial cold beverage dispenser the coolant tank 8 typically will hold about 5 gallons of coolant liquid. The coolant liquid can be water or any other kind of coolant liquid used in cooling systems. Because we have at our disposal a very cold coolant reservoir we can dispense the beverage at a high rate (preferably 2-3 ounces per second). In addition, the very efficient heat exchanger 7 is small in size and can be mounted very close to the spigots therefore the volume of the trapped water in the tubing is very small.

The closed loop cooling system works as follows:

The circulating pump 9 circulates the coolant liquid continuously through the heat exchanger 7, the chiller 6, and the holding tank 8, typically at a rate of few gallons per minute. The coolant liquid temperature is regulated by a temperature control system (not shown) which also controls the chiller on/off time.

The incoming fresh water is connected to the dispenser through a water filter 1 to improve the quality and test of the dispensed cold beverage. The incoming water flow is controlled by the input valve 2 and its pressure, in the dispenser, is controlled by the pressure regulator or flow restrictor 3. The incoming filtered water is split to two arms at junction 18. One arm is connected to the input of one half of the heat exchanger 7 while the second arm is connected to the input of valve 11.

The part of the filtered, fresh water that is flowing through the heat exchanger 7 is cooled down to within few degrees of the coolant temperature by the very cold coolant, which is circulating at high flow rate in the second half of the heat exchanger 7. The flow rate of the fresh, very cold, filtered water from the heat exchanger 7 is controlled by valve 10. The outputs of the control valves 10 and 11 are connected together at junction 19. The output of junction 19 is connected in parallel to all the beverage dispensing stations (25a-25d).

To enhance the customer satisfaction, our advanced cold beverage dispenser will allow each customer to select the temperature of the dispensed beverage. The temperature of the dispensed beverage is measured by the temperature sensor 14 located at the output of junction 19. Controller 30 will adjust the duty cycles of the cold valve 10 and warmer valve 11 differentially to control the temperature of the water at junction 19 anywhere between the temperature of the cold water from the heat exchanger 7 and the temperature of the incoming water 1. Thus, if cold valve 10 is open all the time (i.e. 100% duty cycle), and input temperature valve 11 is closed (0% duty cycle), the temperature at 19 will be the same as the cold water. Conversely, if cold valve 10 is at 0% duty cycle, and input temperature valve 11 is at 100%, the temperature is the same as the input water. At 50% duty cycle on each valve, the temperature is halfway between.

The dispensed beverage temperature control method is the same as described in the parent patent application Ser. No. 11/155,058 entitled "Beverage Dispenser" filed on Jun. 17, 2005, which application is incorporated herein by reference.

In addition, our advanced cold beverage dispenser will preferably allow each customer to select whether or not they would like to add carbonation and the amount of carbonation they would like to add.

The carbonation system includes the carbon-dioxide tank 12, which can be located outside the dispenser, regulator valve or flow restrictor 13 and a gas flow meter 22. The carbon-dioxide is injected into the cold water at junction 20. A digital feedback control system regulates the amount of carbonation according to the customer selection via a user input interface, such as touch screen 5. The carbonation control system operates as follows:

The control system uses the water flow rate, as measured by the water flow meter 4, as one input and the customer carbonation selection from the touch screen 5 as a second input. Using these two inputs the controller code calculates the required $CO_2$ flow rate. The $CO_2$ flow rate, which is measured by the gas flow meter 22, is compared to the calculated rare and the controller modulates the on/off duty cycle time of valve 13 in such a way that the amount of $CO_2$ dispensed with the cold beverage is according to the customer selection.

The method of controlling the carbonation by controlled mixing of the $CO_2$ and water by varying the duty cycle of valve 13 is analogous to the control of temperature by regulating the duty cycle of valves 10 and 11. The higher the duty cycle of valve 13 (i.e. the longer the valve is open relative to the time the valve is closed in a given cycle) the more $CO_2$ mixes with the water, and thus the resulting beverage is more carbonated. For noncarbonated beverages, valve 13 is left closed (0% duty cycle), for maximally carbonated beverages it is left open (100% duty cycle), and any other duty cycle is somewhere in between.

Flavored liquid beverage concentrates at each dispensing station 25a-25d, which are preferably stored in airless collapsible bags 15, will preferably be loaded into the dispenser from the front of the dispenser to allow easy and fast replacement of the empty bags. The liquid beverage concentrate is injected by pump 16 into the cold water at junction 21, and valve 17 controls the flow of beverage into the user's cup at the dispensing station 25a-25d.

In order to further enhance the customer satisfaction our dispenser will preferably allow each customer to select the "strength" of his cold beverage using the touch screen 5. Each one of the strength options will determine a different mixing ratio between the cold water and the liquid beverage concentrate.

To control the mixing ratio between the cold water and the beverage concentrate the dispenser uses a digital feedback control loop, using the water flow rate, as measured by the water flow meter 4, to accurately control the beverage concentrate dispensing device 16.

The dispensing device 16 is preferably a pump with a controllable pump rate, whether by controlling the frequency of cycling of a piston-type pump, or the speed of rotation of a peristaltic pump, or some other approach. When the pump is at maximum output (i.e. fastest stroke rate or peristaltic rotation speed), the beverage is strongest. Reducing the pump output reduces the strength of the beverage proportionally.

The mixing ratio control method for different concentrate dispensing devices is described in detail in parent patent application Ser. No. 11/155,058 filed on Jun. 17, 2005, which is incorporated here by reference.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A cold beverage dispenser comprising:
 a) a source of circulating cold liquid;
 b) a water input coupled to a water supply;
 c) a source of circulating cold liquid comprising a chiller, a reservoir for storing cold liquid, and a circulating pump;
 d) a liquid-to-liquid heat exchanger having an input coupled to the water input, an output for cooled water, and a heat-exchange circuit through which the circulating cold liquid from the source of circulating cold liquid circulates, such that water from the input is cooled by exchange with the cold liquid, and the cooled water exits from the output of the heat exchanger at a reduced temperature;
 e) a cold valve having an input coupled to the output of the heat exchanger, an output for dispensing cooled water, and a control input, such that the cold valve controls flow from the input to the output in response to a signal from a controller; and
 f) a beverage dispensing output coupled to the output of the cold valve.

2. The beverage dispenser of claim 1, further comprising:
 g) a controller, comprising:
  i) at least one control signal output
  ii) at least one sensor input;
  iii) a user input interface;
  iv) control logic coupled to the at least one control signal output, the at least one sensor input and the user input interface, such that the control logic controls at least one control signal output in response to user input at the user input interface;
 h) a source valve having an input coupled to the water input, a control input for controlling flow through the valve in response to a signal from a control output of the controller and an output for dispensing source-temperature water under control of the control input;
 i) a temperature mixing junction coupled to the output of the cold valve and the output of the source valve, for mixing the cooled water and source-temperature water into a mixed water stream at an output;

the controller issuing signals on the control output coupled to the control input of the cold valve and on the control output coupled to the control input of the source valve, such that the stream of mixed water is maintained at a selected temperature.

3. The beverage dispenser of claim 2, further comprising:

a temperature sensor sensing the temperature of the mixed water stream, having an output coupled to a sensor input of the controller;

the control logic of the controller being programmed to read the temperature of the mixed water stream from the sensor input coupled to the temperature sensor, and to control the control output coupled to the control input of the cold valve and on the control output coupled to the control input of the source valve, such that the stream of mixed water is maintained at a selected temperature.

4. The beverage dispenser of claim 3, further comprising a water flow sensor coupled to the water input, and the control logic of the controller being programmed to read the water flow from the water flow sensor, and to control the control output coupled to the control input of the cold valve and on the control output coupled to the control input of the source valve based on both temperature and water flow, such that the stream of mixed water is maintained at a selected temperature.

5. The beverage dispenser of claim 2, in which control signals sent to the cold valve and the source valve are pulse-width modulated, such that the flow through each valve is controlled by varying a duty cycle of the pulse-width modulated signals.

6. The beverage dispenser of claim 2, further comprising at least one dispensing section comprising:

a) a reservoir of beverage concentrate having an outlet;
b) a pump having an input coupled to the output of the reservoir outlet, an output, and a control input coupled to a control output of the controller, such that a signal on the control input causes the pump to pump a defined amount of beverage concentrate from the pump output;
c) a section water input coupled to the temperature mixing junction, for accepting the mixed water stream at the defined temperature; and
d) a beverage mixing junction in which the beverage concentrate and the mixed water stream are mixed, having inputs coupled to the section water input and the pump output, and an output coupled to the beverage dispensing output.

7. The beverage dispenser of claim 6, further comprising a beverage valve in the mixed stream of water, between the temperature mixing junction and the beverage mixing junction, having a control input coupled to a control output of the controller such that quantity of the mixed water stream into the beverage mixing junction is controlled by the controller through a signal on the control input of the beverage valve.

8. The beverage dispenser of claim 6, in which the pump is a positive displacement pump.

9. The beverage dispenser of claim 6, further comprising:

a flow sensor sensing water flow in the water input, coupled to a sensor input of the controller;

the control logic of the controller being programmed to read the water flow from the flow sensor and provide an output to operate the pump to mix a selected amount of beverage concentrate with the water, such that the beverage dispensing output of the beverage dispenser dispenses beverages of a selected concentration.

10. The beverage dispenser of claim 3, in which the temperature sensor is located adjacent to the beverage dispensing output.

11. The beverage dispenser of claim 3, in which the temperature sensor is located adjacent to the output of the temperature mixing junction.

12. The beverage dispenser of claim 2, further comprising:

a source of carbonation gas;

a carbonation valve having an input coupled to the source of carbonation gas, a control input coupled to a control output of the controller, and a gas output;

a carbonation mixing junction having a water input coupled to the output of the temperature mixing junction, a gas input coupled to the gas output of the carbonation valve, and a carbonated water output.

13. The beverage dispenser of claim 10, further comprising a water flow sensor coupled to the water input, a gas flow sensor sensing gas flow in the carbonation gas input, coupled to a sensor input of the controller;

the control logic of the controller being programmed to read the gas flow from the gas flow sensor and the water flow from the water flow sensor, and provide an output to operate the carbonation valve to mix a selected amount of carbonation gas with the water, such that the beverage dispensing output of the beverage dispenser dispenses beverages of a selected carbonation level.

14. The beverage dispenser of claim 1, further comprising a pressure regulator between the water supply and the water input.

15. The beverage dispenser of claim 1, in which the source of circulating cold liquid is located remotely.

16. The beverage dispenser of claim 2, further comprising a dispensing valve lever adjacent to the beverage dispensing output and coupled to a sensor input of the controller, such that the controller logic begins dispensing beverage in response to operation of the dispensing valve lever.

17. The beverage dispenser of claim 2, in which the operator interface comprises a touch-screen.

* * * * *